J. M. AND T. N. DE PUE.
AUTOMOBILE LOCK.
APPLICATION FILED MAR. 4, 1918.
1,315,949.
Patented Sept. 16, 1919.
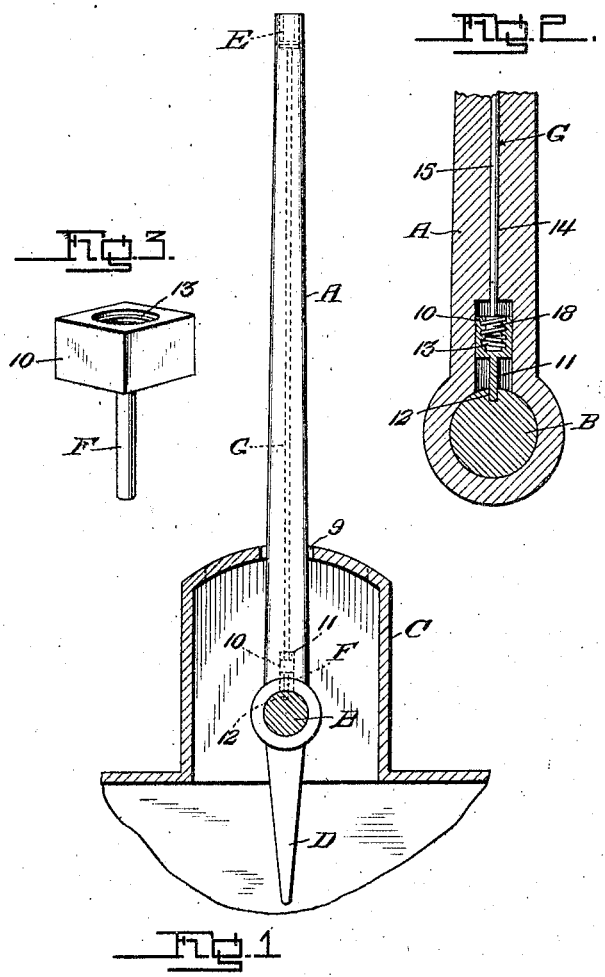
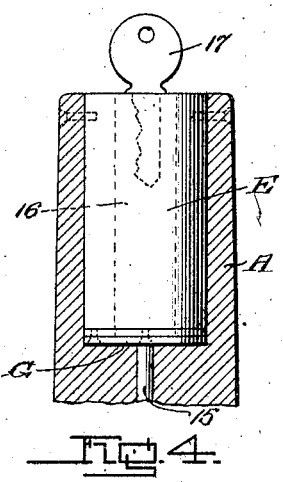
Inventors
J. M. De Pue,
T. N. De Pue,
By Lancaster and Allwine
their Attorneys

UNITED STATES PATENT OFFICE.

JAMES MARSHALL DE PUE AND THOMAS N. DE PUE, OF SPENCER, WEST VIRGINIA.

AUTOMOBILE-LOCK.

1,315,949.

Specification of Letters Patent.

Patented Sept. 16, 1919.

Application filed March 4, 1918. Serial No. 220,212.

*To all whom it may concern:*

Be it known that we, JAMES MARSHALL DE PUE and THOMAS N. DE PUE, citizens of the United States, and residents of Spencer, in the county of Roane and State of West Virginia, have invented a certain new and useful Improvement in Automobile-Locks, of which the following is a specification.

Our present invention relates to automobile locks, and more particularly to lock structure adapted to be associated with a swinging or sliding transmission shift lever.

An object of our invention is to provide a structure of the character described which can be installed in conjunction with the shift lever by being fitted to be contained entirely within the same and which offers no projections from or obstructions upon the lever.

A further object is to so construct the parts that the lock is set and released by turning of an authorized key inserted within the key slot thereof.

Further objects of our invention will appear in the following description, taken in connection with the accompanying drawing, forming part of this specification, and in which drawing:

Figure 1 is a view partly in section showing the fitting of the lock structure to a sliding transmission shift lever.

Fig. 2 is an enlarged detail sectional view of parts shown in Fig. 1.

Fig. 3 is a perspective view illustrating the bolt and bolt carrying member.

Fig. 4 is a sectional view through the lever to show the manner in which the lock is fitted in place.

In the drawing, where similar characters refer to similar parts throughout the views, A designates a shift lever adapted to shift the transmission gearing by being slid along the shaft B to two extreme positions and to then be swung forward and back, the shaft B being fixed in conjunction with a case C which has the usual H-shaped slot through which the lever A is moved, the shifting being accomplished through an arm D. The bolt locking structure is mounted in the outer end of the lever A as indicated at E, the bolt F being disposed to be extended into the bore through which the shaft B is received, and a bolt shifting rod G being provided to move the bolt as the lock structure is turned.

With the transmission shift as above set forth, the cross bar of the H-shaped slotted opening as indicated at 9 receives the lever A when the same is brought to a neutral position, and therefore the lock structure is adapted to secure the lever within this cross branch of the slots. The bolt F is carried by a shifting member 10, which is of polygonal form and which is fitted within a correspondingly shaped opening 11 in the lever A adjacent the bore through which the shaft B is received. The shaft B has a bolt opening 12 therein, and as the bolt carrying member 10 is slid downwardly the bolt F will fit within the opening 12 and in consequence the lever A is held against movement along the shaft B. The bolt carrying member 10 has an internally threaded bore at the upper end thereof as indicated at 13, which bore lines up with a bore 14 in the lever A and extending throughout the length thereof. A bolt shifting rod 15 is mounted revolubly in this bore 14, and is connected with the turning portions 16 of the bolt lock E, these being the portions turned by the key 17. On its lower end the rod 15 has a feed screw 18, which is preferably of comparatively steep pitch and which fits to the threads of the bore 13 of the bolt carrying member 10.

With the parts arranged as above set forth, when the key 17 is inserted within the lock E and is turned to revolve the portion 16 of the lock and to consequently turn the rod 15, the bolt carrying member 10 will be moved to extend or withdraw the bolt F, corresponding to the direction in which the key is turned, and in consequence at the will of the operator the bolt can be brought to the locked and to the released positions.

Changes in details may be made without departing from the spirit or scope of our invention; but,

We claim:

In an automobile lock the combination with a gear shift lever and a stationary fulcrum on which said lever moves said lever provided with a polygonal recess open to said fulcrum, and the latter provided with a recess positioned to be open to the said recess of said lever, when in a predetermined position, of a bolt adapted to enter the said recess of said fulcrum and provided with a polygonal head slidable in the said recess of said lever, said head provided with an axial screw threaded bore, a lock carried by said lever and having a portion thereof adapted to be moved by the use of an authorized key, and a feed screw operatively connecting the said movable head of said lock and in screw threaded engagement with the said bore of said bolt to slide the latter in an extended or withdrawn position with respect to the recess of said fulcrum.

JAMES MARSHALL DE PUE.
THOMAS N. DE PUE.